United States Patent [19]

Morgan et al.

[11] Patent Number: 4,894,397

[45] Date of Patent: Jan. 16, 1990

[54] STABLE EMULSION POLYMERS AND METHODS OF PREPARING SAME

[75] Inventors: Lee W. Morgan, Racine; Richard J. Esser, Nieuwkoop; Dennis P. Jensen, Burlington, all of Wis.

[73] Assignee: S. C. Johnson & Son, Inc., Racine, Wis.

[21] Appl. No.: 184,480

[22] Filed: Apr. 21, 1988

[51] Int. Cl.[4] .................. C08F 9/00; C08F 265/04; C08G 9/00; B32B 3/10

[52] U.S. Cl. .................................. 523/201; 428/137; 525/308

[58] Field of Search .................... 523/201; 428/137; 525/308

[56] References Cited

U.S. PATENT DOCUMENTS

| | | | |
|---|---|---|---|
| 3,244,655 | 4/1966 | Sullivan et al. | 524/460 |
| 3,339,080 | 8/1967 | Howald | 172/752 |
| 3,399,080 | 8/1968 | Vitkuske | 428/454 |
| 3,401,134 | 9/1968 | Fantl et al. | 524/819 |
| 3,404,116 | 10/1968 | Pueschner et al. | 524/446 |
| 4,151,143 | 4/1979 | Blank et al. | 524/533 |
| 4,179,417 | 12/1979 | Sunada et al | 525/444.5 |
| 4,226,752 | 10/1980 | Erickson et al. | 524/460 |
| 4,325,856 | 4/1982 | Ishikawa et al. | 525/308 |
| 4,515,914 | 5/1985 | Tsurumi et al. | 523/201 |
| 4,628,071 | 12/1986 | Morgan | 524/832 |
| 4,695,608 | 9/1987 | Engler | 525/308 |

FOREIGN PATENT DOCUMENTS 814528 6/1969 Canada.

OTHER PUBLICATIONS

Lee and Ishikawa, "The Formation of 'Inverted' Core–Shell Latexes," J. Poly. Sci., 21, pp. 147–154, (1983).
Journal of Applied Polymer Science Article: "Morphology of Latex Particles Formed by Poly(methyl Methacrylate)–Seeded Emulsion Polymerization of Styrene", from vol. 30, pp. 1903–1926 of J.A.P.S.; see also Synopsis, p. 1903, first sentence, by Cho et al.
J.A.P.S. Article: "Preparation of Carboxylated Polymer Emulsion Particles in Which Carboxyl Groups are Predominantly Localized at Surface Layer by Using Seeded Emulsion Polymerization Technique", by Masayoshi et al., Synopsis, p. 1.
S. Muroi Article: "Internal Structure of Latex Particles Formed by [Two]-Stage Feed Polymerization of Ethyl Acrylate-Methacrylate Acid Mixture", p. 1, 2nd para.
Polymer Article: "Properties and Structure of Elastomeric Two-Stage Emulsion Interpenetrating Networks" by Narkis et al., see Abstract, pp. 1–2.
Colloque International sur la Copolymerisation et les Copolymeres en Emulsion, Mar. 1984, pp. 377–386, 387–390, and the English translation, titled: Emulsion Copolymerization, reprinted from Makromol. Chem., Suppl. 10/11, 359–390, (1985), pp. 24–31, See also "Bibliographie" of the English-language Translation.
Journal of Polymer Science: The Formation of 'Inverted' Core-Shell Latexes, by D. L. Lee and T. Ishikawa, in the polymer Chemistry Edition, vol. 21, at pp. 147–154, published 1983.

*Primary Examiner*—Morton Foelak
*Assistant Examiner*—C. Azpuru

[57] ABSTRACT

An improved process for pruducing stabilized, core-shell latex emulsions is disclosed. In a process which comprises preparing a hydrophilic polymer and contacting the hydrophilic polymer with a hydrophobic monomer for producing an inverted core-shell latex emulsion, the improvement comprises the additional step of adjusting the pH of the inverted core-shell latex emulsion to dissolve the hydrophilic polymer, thereby to produce a stabilized, core-shell latex emulsion.

18 Claims, No Drawings

STABLE EMULSION POLYMERS AND METHODS OF PREPARING SAME

BACKGROUND OF THE INVENTION

This invention relates to stable, aqueous latexes and to methods for their preparation.

Aqueous dispersions of polymers, which are referred to in the art as latexes, are generally known to be useful, both alone and in various formulations, as coatings and impregnants. A wide variety of latexes of differing homopolymeric and copolymeric compositions (such as styrene-butadiene copolymers, acrylic homopolymers and copolymers, vinylidene chloride homopolymers and copolymers, etc.) have been developed having specific chemical and/or mechanical properties for particular end use applications. For example, aqueous interpolymer latexes resulting from the emulsion polymerization of monovinyl aromatic monomers, such as styrene; diolefins, such as butadiene, and monoethylenically unsaturated carboxylic acids, such as acrylic acid, are known to be particularly useful as film-forming binders for pigments in paper coating applications. See, for example U.S. Pat. Nos. 3,399,080 and 3,404,116. Such emulsion polymerizations optionally employ conventional seeding procedures for optimum control of polymerization and in order to obtain maximum product uniformity (e.g., narrow particle size distribution).

U.S. Pat. No. 4,151,143, issued to Blank et al., discloses a surfactant-free polymer emulsion coating composition and a method for preparing the same. Blank et al. identify that a main problem with emulsion polymers employed for coatings is the presence of surfactants which are employed to stabilize emulsions but which adversely affect the water and corrosion resistance of the resulting film as well as the adhesion of the coating especially to metal surfaces. The Blank et al. emulsion polymers are prepared in a two stage process. The process includes (1) a first stage wherein a conventional carboxyl group containing polymer is prepared by a conventional solution or bulk polymerization technique and thereafter water-dispersed or solubilized by partial or full neutralization thereof with an organic amine or base and application of high shear agitation and (2) a second stage wherein a mixture of polymerizable monomers and polymerization catalyst is added to the first stage emulsion at an elevated temperature to effect polymerization of the stage two monomers resulting in the formation of an emulsion coating composition. The coating composition is surfactant-free.

U.S. Pat. No. 4,179,417, issued to Sunada et al., discloses a composition for water based paints containing a water soluble resin and a water dispersible polymer. The water soluble resin contains 50-99.5 percent by weight of an alpha, beta-monoethylenically unsaturated acid alkyl ester to an alkenyl benzene, 0.5-20 percent by weight of an alpha, beta-monoethylenically unsaturated acid and 0-30 percent by weight of a hydroxyalkyl ester of an alpha, beta-monoethylenically unsaturated acid. These monomers are polymerized in the presence of an alkyd resin containing a polymerizable unsaturated group, epoxy esters containing a polymerizable group, drying oils, fatty acids of drying oils and diene polymers. The resulting polymers are water solubilized by the addition of ammonia or an amine. The water dispersible polymer contains hydroxy and/or carboxyl functional groups and contains an alpha, beta-monoethylenically unsaturated acid monomer and/or a hydroxy alkyl ester of such a monomer and other ethylenically unsaturated monomers. The compositions disclosed in U.S. Pat. No. 4,179,417 are employed in water based paints and can optionally contain a cross linking agent.

Canadian Pat. 814,528, issued June 3, 1969, discloses low molecular weight alkali soluble resin, resin solutions and methods of their preparation and purification. The resins are disclosed as being especially useful as emulsifiers, leveling agents, and film-formers. The number average molecular weight of the resins range from 700-5000 and the resins have acid numbers between 140-300. The resins are disclosed as emulsifiers in the preparation of emulsion polymers resulting in emulsion polymers which are stable and substantially free from coagulum. For this use, i.e., emulsifier in emulsion polymerization reactions, the resins must have a number average molecular weight between 1,000 and 2,000 and preferably between 1,000 and 1,500. Resins having a number average molecular weight greater than 2,000 may lead to unstable and coagulated emulsion polymers when used as the emulsifier in emulsion polymerization reactions.

Two stage latex polymers are known to exist in many morphological forms, which are determined by many factors including the relative hydrophilicity, miscibility and molecular weights of the first and second stage polymers. So-called "core-shell" latexes are formed when the second stage polymer forms a "shell" or coating around a discrete domain or "core" of the first stage polymer. Examples of such core-shell latexes are disclosed in U.S. Pat. No. 4,515,914 where an exemplary composition contains a first stage styrene/butadiene core polymer which is encapsulated by a shell of a second stage monovinyl polymer. "Inverted core-shell" latexes are also known. Lee and Ishikawa, "The Formation of 'Inverted' Core-Shell Latexes, "J. Poly. Sci., 21, 147-154 (1983) shows that such "inverted" latexes are those where the second stage polymer becomes the core domain and is encapsulated by the shell first stage polymer. These inverted latex compositions can be formed when the first stage polymer is more hydrophilic than the second stage polymer. Lee and Ishikawa studied the formation of the "inverted" core-shell morphology using two polymer pairs; a dsoft polymer pair [ethyl acrylate/methacrylic acid (EA/MAA) (90/10)]/[styrene/butadiene (S/B)(60/40)] and a hard polymer pair [EA/S/MAA (50/40/10)]/[S (100)]. The ratio of monomers in the polymers is in parts by weight. Soft polymers have a relatively low glass transition temperature (Tg), generally below about 20° C., while hard polymers have a relatively high Tg, generally above about 20° C. It was found that in the case of the soft polymer pair systems, the formation of inverted core-shell morphology was equally complete, regardless of the molecular weight of the hydrophilic polymer molecules, whereas in the case of the hard polymer pair systems, the efficiency of inversion depended upon the molecular weights of the hydrophilic and hydrophobic polymers. The study suggests that the formation of inverted core-shell latexes depends not only on the hydrophilicity, interfacial tension, and molecular weight of the hydrophilic polymer molecules, but also on the extent of phase separation between two polymers.

Lee and Ishikawa also noted the alkali swellability of the first stage polymer in these inverted emulsion systems.

Muroi, et al. "Morphology of Core-Shell Latex Particles," J. Poly. Sci., 22, 1365–1372 (1984) evaluated latex particles formed when an ethyl acrylate-methacrylic acid or methyl acrylate (MA)-MAA mixture was polymerized in the presence of poly (MA-MAA) or poly (EA-MAA) seeds. They found that the shell was composed of the more hydrophilic poly (MA-MAA) molecules which were relatively high in MAA content and the core was composed of both poly (MA-MAA) and poly (EA-MAA) molecules, with the copolymeric particles being relatively uniform from surface to center in distribution of all components except MAA. The monomer content of MAA increased in the direction of the shell surface.

In particular, Muroi, et al. studied five compositions, including one where the first stage feed was MA/MAA (90/10) and the second stage feed was EA/MAA (90/10). The authors found that as the pH of the resulting latex was increased through the additon of NaOH, the optical density decreased, indicating complete dissolution of all the latex particles.

A commonly assigned, copending patent application Ser. No. 899,281 filed Aug. 22, 1986 is directed to emulsions formed by adding a preformed support resin during emulsion copolymerization of monomers adapted to form low molecular weight anionic polymers, such as the ammonia salt of styrene/acrylic acid polymer. Films produced from such emulsions are sometimes unduly brittle and subject to alkali attack, which is particularly a problem when the emulsion is designed for use as a polish or varnish. In addition the anionic polymers must be present in substantial amounts to stabilize the support resin and accordingly, act as polymeric surfactants.

In view of the above it is desirable to provide a stable latex emulsion capable of employing a relatively broad spectrum of hard and soft monomers and basic functional, as well as acid functional monomers.

SUMMARY OF THE INVENTION

The present invention is a stabilized latex emulsion and the process for preparing it. The process comprises:

(a) preparing a hydrophilic, low molecular weight first stage polymer by emulsion polymerization;

(b) conducting a second emulsion polymerization to produce a hydrophobic second stage polymer under conditions sufficient to cause the second stage polymer to partition into the first stage polymer thus producing an inverted core-shell latex; then (c) adjusting to pH of the resulting inverted core-shell emulsion to dissolve the first stage polymer, thereby creating a continuous aqueous phase consisting of the first stage polymer and a discontinuous phase containing discrete stabilized particles of the second stage polymer.

The latexes of this invention exhibit excellent mechanical properties as a result of the stabilization of the second stage polymer. Many latexes of this invention exhibit superior coating properties for those applications known in the art. Such applications include uses in floor polish, varnishes, including water-borne graphic arts varnishes. paints, inks, adhesives, and the like.

DETAILED DESCRIPTION OF THE INVENTION

The polymer particles of this invention are broadly characterized as latex particles comprising a hydrophilic first stage polymer dissolved in a continuous aqueous phase containing discrete domains of a hydrophobic second stage polymer. As employed herein the term "hydrophilic" means that the polymer is capable of being dissolved in an aqueous medium upon adjustment of the pH. First stage polymers containing acid functional groups will be solubilized upon addition of alkali; first stage polymers containing basic functional groups will be solubilized upon addition of acid.

The term "hydrophobic" as used herein includes a polymer which will not be dissolved in any aqueous medium by adjusting the pH.

For purposes of this invention, the term "inverse core-shell latex" means a latex formed in a two stage polymerization process wherein the second stage polymer tends to form a core domain in the first stage polymer. The first stage polymer may encapsulate the second stage polymer or form a shell around the second stage polymer core or can carry the second stage polymer in its swollen matrix. It is also possible to engraft a portion of the second stage polymer to the first stage polymer to further stabilize it.

"Emulsion polymerization" as the term is employed herein, is a process which requires comonomers, an initiator, and water as the continuous phase. This invention may also optionally employ such commonly used emulsion polymerization ingredients as chain transfer agents to regulate the molecular weight of the resulting first and/or second stage polymers, free radical polymerization catalysts and cross-linking agents.

The first step in the emulsion polymerization process of this invention is selecting the monomers which will produce the hydrophilic first stage polymer. The monomers should be selected so that there is at least one monomer from each of two monomer groups consisting of (i) water insoluble monomers and (ii) functional group-containing monomers.

As employed herein, the term "water insoluble monomers" is intended to include those monomers forming polymers, which, upon pH adjustment, do not become appreciably water soluble.

As employed herein, the term "functional group-containing monomers" includes those monomers forming polymers whose solubility characteristics are appreciably changed upon pH adjustment.

Typical water insoluble monomers are vinyl monomers, including monovinyl aromatic monomers, and open chain conjugated dienes.

The water insoluble vinylic monomer of the invention is preferably a monoalkenyl aromatic monomer, such as methyl styrene, α-methylstyrene, tertiary butyl styrene or, most preferably, styrene. Other water insoluble vinylic monomers may be employed in this invention, including: acrylic and methacrylic esters; such as methyl methacrylate, 2-ethyl hexylacrylate, butyl acrylate, butyl methacrylate, hydroxy functional acrylates such as 2-hydroxyethyl methacrylate, 2-hydroxyethyl acrylate, and the like, methylol acrylamide, glycidyl acrylate and glycidyl methacrylate. It is possible to substitute for a portion of the water insoluble vinylic monomer, a relatively soluble vinylic monomer, such as vinyl acetate and methyl acrylate.

The term "monovinyl aromatic monomer" is intended to include those monomers wherein a radical of the formula

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho-, meta- and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, vinylnaphthalene, diverse vinyl(alkylnaphthalenes) and vinyl(halonaphthalenes) and comonomeric mixtures thereof.

The term "open chain conjugated diene" is meant to include, for example, 1,3-butadiene, 2-methyl-1,3-butadiene, 2,3-dimethyl-1,3-butadiene, pentadiene, 2-neopentyl-,3-butadiene and other hydrogen analogs of 1,3-butadiene and, in addition, the substituted 1,3-butadienes, such as 2-chloro-1,3-butadiene, 2-cyano-,3-butadiene, the substituted straight chain conjugated pentadienes, the straight chain and branched chain conjugated hexadienes, other straight and branched chain conjugated dienes typically having from 4 to about 9 carbon atoms, and comonomeric mixtures thereof.

The functional group containing monomers can have basic or acidic functionalities, such as amino, or carboxy functionality. Typical functional group containing monomers include acid group containing monomers such as acrylic acid, methacrylic acid and other unsaturated acid monomers, and basic group containing monomers such as vinyl pyridines, and amino acrylates and methacrylates.

The acrylic monomers employed in the process of the invention include acrylic acid or methacrylic acid, either alone or admixed with at least one other unsaturated monomer, such as esters or acrylic or methacrylic acid, hydroxyethyl methacrylate, methacrylonitrile, acrylonitrile or the like.

Other unsaturated acid monomers can also be substituted in minor part for the preferred acrylic acids. Such unsaturated acid monomers include; maleic acid, crotonic acid, fumaric acid, itaconic acid, vinyl benzoic acid and isopropenyl benzoic acid.

Typical amines include the vinyl pyridines, dimethyl aminoethyl methacrylate and tert-butylamino ethylmethacrylate. Crosslinkable monomers such as glycidyl acrylate and the like can also be employed.

The glass transition temperatures (Tg) of the first stage polymer will be an important factor in the film forming properties of the desired polymer stabilized latex. Therefore, monomers are selected such that the first stage polymer will exhibit a Tg suitable for the end application.

The first stage monomers are selected so that a hydrophilic first stage polymer will be produced. Additionally, the monomers are selected with a view toward the ultimate use of the latex film to be produced, the chemical resistance required of the latex and whether cross-linking of the polymers is desired. If the resulting emulsion is to be crosslinked, then crosslinkable monomers should be used to form the first stage polymer.

Preferred monomer formulations for the first stage polymer include ethyl acrylate (EA) and methacrylic acid (MAA), and, particularly the combination 80EA/20MAA. Styrene (S) and acrylic acid (AA) form another preferred composition, particularly, the combination 60S/40AA. A third preferred monomer composition is methyl methacrylate (MMA), butyl acrylate (BA) and methacrylic acid (MAA), especially 58MMA/30 BA/12MAA.

Sufficient functional group containing monomer is present to ensure that the first stage polymer will dissolve upon adjustment of the pH. For this and other purposes, the ratio of water insoluble monomer to functional group monomer is from 10:1 to 1:3. A more preferred ratio is from 10:1 to 1:1. The most preferred embodiment is where the water insoluble monomer to functional group monomer ratio varies from 7:1 to 3:2.

A chain transfer agent is preferably added to the first stage monomers during emulsion polymerization to regulate the molecular weight of the first stage polymer. The number average molecular weight should not generally exceed about 20,000, otherwise the first stage polymer will usually cause the system to become exceedingly viscous upon pH adjustment. However, employing higher molecular weight might be useful for some compositions, especially those where high viscosity is desirable. As employed herein the phrase "molecular weight" refers to number average (Mn) molecular weight, unless indicated otherwise.

The first stage polymer must be capable of dissolving upon proper adjustment of the pH. For this and other purposes such as viscosity considerations, the preferred molecular weight for the first stage polymer is from about 3,000 to 10,000. The most preferred molecular weight is from about 3,000 to 6,000.

Selection of appropriate chain transfer agents for molecular weight control is important for obtaining homogeneous, low molecular weight polymers. Chain transfer agents must be efficient, exhibit high transfer activity, produce controllable molecular weight distribution and not adversely affect the polymerization rates. Conventional chain transfer agents may be employed which meet such standards, such as mercaptocarboxylic acids having 2 to 8 carbon atoms, and their esters. Examples of suitable chain transfer agents are mercaptoacetic acid, 2-mercaptopropionic acid, 3-mercaptopropionic acid, mercaptopropionic acid, 2-mercaptobenzoic acid, mercaptosuccinic acid, mercaptoisophthalic acid and alkyl esters thereof. It is preferred to employ a mercaptomonocarboxylic acid and/or a mercaptodicarboxylic acid containing 2 to 6 carbon atoms, more particularly, a mercaptopropionic acid, and alkyl esters thereof, especially the isooctyl ester of mercaptopropionic acid.

Other organic type chain transfer agents are also preferred, including halogenated hydrocarbons, such as bromoform, carbon tetrachloride and bromotrichloro methane.

In general, there is a reduction in polymerization rate and an increase in steady state monomer concentration with increasing addition levels of chain transfer agent. Generally, no greater than about 6 mole percent of chain transfer is employed based on total molar weight of the monomer charged. On the other hand, as the addition level of chain transfer agent is reduced, both the polymer polydispersity index and the molecular weight increase, since chain transfer activity is reduced. Accordingly, no less than about 0.5 mole percent chain transfer agent is normally employed. If it is desired to make higher molecular weight polymers with higher polydispersity, then the amount of chain transfer agent employed can be reduced to below 0.5 mole % and usually to at least about 0.3 mole %. It is preferred to use from about 1–3 mole % of a chain transfer agent.

The chain transfer agent is normally added to the reaction mix incrementally, along with the monomers of the first stage. A portion of the chain transfer agent may be added to a functional group containing monomer precharge, usually in the same relative proportion as the functional group monomer. For most purposes, the precharge preferably contains about 10% of the entire charge of chain transfer agent. The choice of type and amounts of chain transfer agents and their effects are well known to those skilled in the art.

Initiation is a factor in the emulsion polymerization process and is important for the preparation of homogeneous products. To enhance initiator efficiency, to provide desired polymerization rates, and to provide product of finer particle size, it may be preferable to gradually add initiator to the reaction mix. Precharging initiator prior to the onset of polymerization or rapidly adding initiator may yield premature destruction of initiator from the high radical concentrations produced. Employing high polymerization temperatures also may induce early consumption of initiator. For the above and other purposes low temperature initiators are preferred. Best results are attained with persulfate initiators and, especially, with ammonium persulfate. Mixtures of such initiators may also be employed.

In general, from about 0.25 to 2 weight percent of initiator based on a weight basis of total monomers charged is employed. The particular identity and quantity of initiator selected will depend, in part, upon the desired polymerization rate, the comonomers addition rate, the reaction temperature and the like.

If desired, a post-addition of initiator may be employed to drive the reaction to completion. The choice of type of initiator and amounts of initiator and their effect will be apparent to those skilled in the art.

An emulsifier, typically an anionic emulsion polymerization surfactant such as sodium lauryl sulfate, can be utilized to promote emulsion polymerization and to stabilize the reaction. Other emulsifiers, such as alkali metal sulfates, sulfonates or sulfosuccinic esters and nonionics, can also be utilized.

The selection of the monomers that make up the hydrophobic second stage polymer is important. These monomers can be selected from the same group of monomers used to produce the hydrophilic first stage monomers; however, the monomers and their relative ratios are selected so that the resulting polymer will not be water soluble upon pH adjustment. Further, the resulting second stage polymer must be capable of partitioning into the existing first stage polymer in order to form domains on or within the first stage polymer. Accordingly, the second stage polymer must be relatively incompatible with the first stage polymer.

The molecular weight of the second stage polymers may also be modified or regulated by use of the chain transfer agents discussed earlier herein. One function of the second stage polymer may be to enhance film strength. For that purpose the molecular weight should be significantly higher than that employed for the first stage polymer. Generally, molecular weights of 15,000 to 200,000 are acceptable for the second stage polymers of this invention. Higher molecular weights, if desired, can be obtained by methods known in the art, such as cross-linking. Preferred molecular weights are from 20,000 to 150,000. The most preferred molecular weight range for the second stage polymer is 25,000 to 100,000.

In general, the weight ratio of first stage polymer to second stage monomers can range from about 10:1 to 1:10. Preferably, the ratio is from about 1:1 to 1:10. In the most preferred embodiments, the ratio of first stage polymer to second stage monomers is from about 1:1 to 1:7.

In general, the process of the invention is conducted at the usual temperature range for conventional emulsion polymerization. For most purposes the reaction temperatures are maintained from about 70° C. to 90° C. and preferably at about 80° C. Lower temperatures, if desired, may be utilized using redox polymerization techniques as is well known to those skilled in the art. It is generally preferred that the second stage monomers be polymerized at a temperature above the glass transition temperature for the first stage polymer. This will soften the first stage polymer and permit the second stage polymer to form domains therein and better permit the first stage to flow to better encapsulate the second stage polymer product.

To assist in stabilizing the polymer product and to ensure completion of the reaction, it may be desirable to maintain the reaction mix at the desired reaction temperature for a period of about 1 hour or more after the final additions of comonomers, initiator and chain transfer agent.

The second stage emulsion polymer is formed from monomers which polymerize to form a hydrophobic polymer as defined herein. Monomers similar to those employed for the first stage can be used in the second stage, except that lesser amounts of functional group containing polymers are employed to prevent solubilization upon dissolution of the first stage polymers. In this instance, it is preferred that the second stage polymer contain no more than 10 mole % of functional monomer.

Copolymers of monomers such as monovinyl aromatic monomers, monethylenically unsaturated carboxylic acids and esters thereof, conjugated dienes, acrylonitrile, vinyl acetate, vinyl dichloride and the like can be employed as second stage monomers. Because of considerations such as polymer properties, availability and compatability with the polymer formed by polymerizing the aforementioned monomer charge, it has been found that copolymers of styrene and acrylate esters and/or methacrylate esters; such as methyl methacrylate, butyl methacrylate, 2-ethylhexylacrylate and the like, are preferred.

In order to promote core-shell inversion, it may be desirable to adjust the pH of the first stage polymer reaction mix in order to swell and plasticize the first stage polymer and to thereby promote second stage polymer domain formation therein. A plasticizer or a coalescing agent may similarly promote domain formation.

The reaction conditions for second stage emulsion polymerization are similar to those of the first stage at least with regard to initiator, chain transfer agents, emulsifiers and reaction parameters. Following polymerization, the solids content of the resulting aqueous polymer latex can be adjusted to the level desired by adding water thereto or by distilling water therefrom. Generally, a desired level of polymeric solids content is from about 20 to about 65 and preferably, from about 30 to about 55, weight percent on a total weight basis.

In selecting reaction conditions for the second stage polymerization, it should be understood that sufficient initiator may be present from the first stage to conduct the second stage reaction. The addition of chain transfer agent may, likewise, be necessary in the second stage polymerization, depending upon the desired molecular weight of the second stage polymer. Further, use of additional emulsifier is often unnecessary in the second stage polymerization.

Those skilled in the art will therefore appreciate that reaction parameters and adjuvants can be modified, as needed, to provide optimum second stage reaction conditions.

The emulsion polymerization process may be conducted as a batch, semi-continuous or continuous process.

The rate of addition of first stage monomers may be important, particularly, if there is difficulty in obtaining uniformity of composition, for example, due to the tendency of monomers to partition to different phases. An example is a first stage of styrene and acrylic acid wherein monomer starved conditions are necessary. In this case a one hour addition may be unsatisfactory, whereas a three hour addition would be preferable. Usually, an addition rate from 0.5 to 4 hours is sufficient for semi-continuous polymerizations, dependent, of course, on the type and amount of initiator, the monomers employed and the polymerization rate, as is well known to those skilled in the art.

The rate of addition of the second stage monomer may also be important. Providing a high rate of second stage monomer addition may make the first stage more soluble. This can affect morphology and grafting. Similar rates of addition compared to first stage addition are normally employed but this also depends on polymerization rates.

Once the inverted-core-shell latex has been formed, the pH of the emulsion is adjusted to dissolve the first stage polymer. If acidic functional group monomers were selected for the first stage polymer, addition of a suitable base is appropriate. If basic functional group monomers were selected for the first stage polymer, addition of an acid is appropriate.

Suitable bases which can be used to adjust the pH include organic and inorganic bases. Examples of such organic bases include amines, morpholine and alkanolamines. Examples of suitable inorganic bases include ammonia, NaOH, KOH and LiOH. Ammonia is a particularly preferred base because it is relatively non-toxic and evaporates from the film, leaving films less water sensitive. If water-sensitivity is desired, then non-fugitive bases, such as sodium or potassium are preferred.

Suitable acids for adjusting pH include organic and inorganic acids, such as acetic acid, hydrochloric acid, and phosphoric acid. Acetic acid would evaporate from a film, thereby improving water resistance. If water sensitivity of a film is desired, then hydrochloric acid is preferred.

The rate of addition of the base or acid to the latex emulsion is usually not important. Sufficient base or acid should be added to achieve dissolution of the first stage polymers. The degree of dissolution of the first stage polymers can be estimated by measuring the change in optical density of the emulsions before and after addition of the pH adjusting agent.

For various applications, it is sometimes desirable to employ small amounts of various known additives in the latex. Typical examples of such additives are bacteriocides (e.g., formaldehyde), antifoamers, etc. Such additives can be incorporated into the latexes of the invention in a conventional manner and at any convenient point in the preparation of such latexes.

The resulting stabilized emulsion can be used to produce a variety of coatings known in the art, including films, polishes, varnishes, paints, inks and adhesives.

The process of this invention can be typically conducted as semi-continuous polymerization as follows:

GENERAL PREPARATION EXAMPLE

In a nitrogen atmosphere, a reactor is filled with water and emulsifier and stirred until a homogeneous solution is formed. The solution is heated to the desired reaction temperature.

The first stage monomers and chain transfer agent are admixed. A precharge of about 15% of the first stage mix are added to the reactor. An initiator in water is thereafter added to induce the pre-charge to polymerize.

The balance of the first stage monomers and chain transfer agent are slowly added (over about 20 minutes to 2 hours) to the reaction mixture.

The pH of the first stage emulsion polymerization reaction mix is optionally raised (assuming an acidic monomer) to about 4.5 to 7.0 to swell the first stage polymer.

Thereafter, over about 60 minutes, the second stage polymerization mix of second stage monomers is added to the desired reaction temperature. After a short holding period, the pH of the reaction mix is slowly raised (ca. 50 minutes) to about 8.0 to 10.0 to release the first stage polymer into solution.

The following examples are intended to illustrate the invention and are not intended to limit the scope thereof.

EXAMPLE 1

To a 1-liter round bottom flask fitted with a paddle stirrer and containing 500 g $H_2O$ at 80° C. under a $N_2$ atmosphere, was added 0.5 g of an emulsifier, sodium lauryl sulfate. Next, 1.0 gram of the free-radical initiator $(NH_4)_2S_2O_8$ was added to the flask. First stage monomers, 80 grams of ethyl acrylate and 20 grams of methacrylic acid were added over a period of 30 minutes, with 2.0 grams of a chain transfer agent butyl mercaptyl propionate. The monomer containing mixture was held at 80° C. for approximately fifteen minutes. The second stage monomer, 100 g methyl methacrylate, was added into the system over a period of 30 minutes. The entire mixture is then held at 80° C. for 1 hour with stirring. The pH was approximately 2.5. The optical density (O.D.) was measured on a Bausch and Lomb Spec 70 at 500 nm in a 10 mm cell at 0.2% N.V. The O.D. was 1.4.

Next, the pH was adjusted to 9.5 using ammonia. The second stage methyl methacrylate polymer was stabilized by dissolution of the first stage ethylacrylate/methacrylic acid polymer. The optical density after pH adjustment was 0.37.

The optical density of the emulsion as well as the size of the emulsion particles were reduced which provided evidence of dissolution of the inverted first stage shell.

EXAMPLE 2

The procedure of Example 1 was followed, however 100 g of styrene was used as the second stage monomer in place of the 100 g of methylmethacrylate. Similar results were obtained and an emulsion latex was formed.

When the O.D. was measured at a pH of approximately 2.5 the O.D. was greater than 2.0. After adjustment to approximately pH 9, the O.D. was 0.82.

EXAMPLE 3

The procedure of Example 1 was followed, however, no emulsifier was added to the first stage polymerization. Similar results were obtained. When measured at a pH of approximately 2.5 the O.D. was 0.40. After adjustment to approximately pH 9, the O.D. was 0.18.

EXAMPLE 4

To provide a clear model to show inverse core/shell emulsion polymerization and also to obtain additional confirmation of release and stabilization of the domains by base solubilization of the first stage, a monomodal first stage alkali soluble emulsion polymer was formulated. Such an emulsion was made via a seeded approach wherein a fine particle size EA/MAA (80/20) (ethyl/acrylate) (methacrylic acid) polymer was made by emulsion polymerization and used as the seed for a second stage of the same composition.

The resulting alkali soluble, low molecular weight "seeded seed" was then characterized at low and high pH by transmission electron microscopy (T.E.M.) and shown to be both monodisperse (94 nm) and alkali soluble. This seed was then used with second stage monomers of both styrene and methyl methacrylate at 5:1 and 1:1 weight ratios and the mix was subjected to emulsion polymerization.

When measured at a pH of approximately 2.5 the O.D. was 1.1. After adjustment to approximately pH 9, the O.D. was 0.66.

The resulting emulsions were then characterized by T.E.M. In all cases phase inversion was noted. At high pH the EA/MAA first stage was shown to be in dissolved state and the discrete second stage domains remained. These results correlated well with the particle size distributions at low and high pH. The distributions tended to show lower, monomodal particle sizes at high pH indicating the presence of the second stage domains after the EA/MAA phase was solubilized. The T.E.M. analytical results also correlated well with the observation of a much lower optical density of the emulsions after the pH was raised.

EXAMPLE 5

To a 1-liter round bottom flask fitted with a paddle stirrer and under a nitrogen atmosphere was added 48 grams water and 0.8 grams of sodium lauryl sulfate (28%). The ingredients were mixed until homogeneous, while heating to a temperature of 80° C.

The following first stage monomers were then mixed with 2.6 grams of a chain transfer agent, bromotrichloromethane:

| | |
|---|---|
| Methylmethacrylate | 76.7 g |
| Butylacrylate | 19.8 g |
| 2-Ethylhexyl acrylate | 19.8 g |
| Methacrylic acid | 15.9 g |

Fifteen percent (20.2 g) of the first stage monomer/chain transfer agent mix was then added to the reaction flask as a precharge. With the temperature at 80° C., 2 g of the initiator ammonium persulphate (predissolved in 5 g of water) was added to the reaction flask.

After reacting the precharge at 80° C. for 10 minutes add the balance of the first stage monomer/chain transfer agent. The mix was added over a period of 30 minutes, while maintaining the 80° C. reaction temperature.

After the addition was complete, the reaction mixture was held at 80° C. for one hour. Then a premix of 10.1 g of an 80% aqueous solution of 2-dimethylamino-2-methyl-1-propanol, 1.4 g ammonia (28%), and 20 g water was added to the reaction mixture using the same feed rate as for the first stage monomer mix. After addition was completed, the reaction mixture is held for 5 minutes at 80° C. The pH was 7.0–7.5.

While the first stage polymer mix was reacting, the following second stage monomers mix was prepared:

| | |
|---|---|
| Methylmethacrylate | 91.4 g |
| Butylmethacrylate | 157.50 g |
| 2-Ethyl-hexyl acrylate | 66.5 g |

The second stage monomer mix was then added over a period of 60 minutes to the neutralized first stage polymer mixture at a temperature of 80° C. After addition of the second stage monomers was completed, the batch was held at 80° C. for 5 minutes.

Next, a premix of 5.6 g ammonia (28%) and 20 g water was added at the same feed rate as the second monomer feed. The reaction mixture was maintained at 80° C. for 50 minutes.

The resulting latex emulsion was cooled and filtered. The emulsion exhibits the characteristics of an inverted core/shell emulsion in which the first stage had been solubilized.

EXAMPLE 6

The procedures of Example 5 was followed, except that the following second stage monomers were employed:

| | |
|---|---|
| Methylmethacrylate | 28.4 g |
| Styrene | 63 g |
| Butylmethacrylate | 157.5 g |
| 2-Ethylhexylacrylate | 66.1 g |

Similar results were obtained.

EXAMPLE 7

A latex for use in floor polish that can provide both the low molecular leveling resins and the high molecular weight colloidal components can be made from the latexes produced according to the present invention, using known procedures and formulations.

As an example, an emulsion polymer was prepared according to the above general preparation example (2 hour first stage monomer addition) using the following raw materials:

Step 1: Preparation of Emulsion Polymer

| | |
|---|---|
| Stage 1 monomers | |
| Styrene | 72.0 g |
| Acrylic Acid | 48.0 g |
| Iso-octyl Mercaptopropionate | 4.8 g |

| Stage 2 monomers | |
| --- | --- |
| Styrene | 210.0 g |
| Butyl Acrylate | 56.0 g |
| Methacrylic Acid | 14.0 g |
| Aqueous phase | |
| Sodium Lauryl Sulfate | 12.0 g |
| Ammonium Persulfate | 4.0 g |
| Deionized Water | 575.0 g |

Step 2: Prepartion of floor polish employing step 1 Emulsion Polymer

An 18.7% nonvolatile, high gloss floor polish was formulated in a conventional manner with the above emulsion. The ingredients are listed below:

| Ingredients | |
| --- | --- |
| Water | 121.4 g |
| Nonionic emulsifier (Triton X405) | 2.5 g |
| 1% Fluorocarbon leveling surfactant (Zonyl FSJ) | 1.3 g |
| 28% NH4OH | 5.8 g |
| Oleic Acid | 1.3 g |
| 26% Nonvolatile wax emulsion (a 1:1 blend of AC-392 and Eplene E-43 polyethylene waxes) | 39.8 g |
| 20% Zinc ammonium carbonate solution | 3.0 g |
| Emulsion polymer | 72.6 g |

EXAMPLE 8

An architectural coating is prepared using the polymer prepared according to Example 5. The coating has the following formulation:

| Paint Base | |
| --- | --- |
| Propylene Glycol | 176.3 g. |
| Disperse Ayd W22$_1$ | 29.39 g. |
| Drew Plus T4500$_2$ | 5.88 g. |
| Water | 53.78 g. |
| Titanium Dioxide (Kronos 2190) | 734.65 g. |
| Paint | |
| Paint Base | 100.00 g. |
| Polymer From Example 5 | 216.00 g. |
| Antifoam (byk 073) | 0.60 g. |
| Dibutyl phthalate | 3.80 g. |

1 - Disperse Ayd W22 is a blend of anionic and nonionic surfactants from Daniel Products, Jersey City, NJ
2 - Drew Plus T4500 is an antifoam agent for water based paints based on mineral oil and a silica derivative from Drew Ameroid The above paint has good gloss, coating and adhesion properties and is expected to have excellent outdoor weatherability.

It will be apparent that the foregoing examples illustrate certain preferred embodiments and are not limitative of scope. Other variations will be obvious to those skilled in this art.

What is claimed is:

1. In a process for producing a latex, which comprises the steps of:
   (a) reacting latex-forming monomers under predetermined emulsion-polymerization reaction conditions to form a hydrophilic, first-stage polymer; and
   (b) contacting the first-stage polymer with an effective amount of at least one hydrophobic, latex-forming monomer under predetermined emulsion-polymerization reaction conditions to form a hydrophobic, second-stage polymer, wherein the second-stage hydrophobic polymer partitions into the first-stage hydrophilic polymer thereby producing an inverted core-shell emulsion polymer,
   wherein the improvement comprises the additional step of adjusting the pH of the inverted core-shell emulsion polymer by an amount effective to dissolve the first-stage hydrophilic polymer, the first-stage hydrophilic polymer being dissolvable and the second-stage hydrophobic polymer being insoluble upon adjustment of pH, for thereby producing a stabilized latex comprising a continuous aqueous phase containing the first-stage hydrophilic polymer and a discontinuous phase containing discrete, stabilized particles of the second-stage hydrophobic polymer.

2. The process according to claim 1, wherein the hydrophilic first stage polymer is formed from at least one water insoluble monomer and a pH sensitive functional group containing monomer.

3. The process according to claim 2 wherein the water insoluble monomer is selected from the group consisting of styrene, methyl styrene, α-methyl styrene, ethyl styrene, isopropyl styrene, tertiary butyl styrene, ethyl methacrylate, methyl methacrylate, butyl acrylate, butyl methacrylate, 2-ethyl hexylacrylate, ethyl acrylate, vinyl acetate, methyl acrylate, open chain conjugated dienes, hydroxyethyl methacrylate, hydroxyethyl acrylate and glycidyl methacrylate.

4. The process according to claim 2 wherein the functional group-containing monomer is selected from the group consisting of methacrylic acid, acrylic acid, maleic acid, crotonic acid, itaconic acid, fumaric acid, vinylbenzoic acid, isopropenyl benzoic acid, vinyl pyridines, dimethyl aminoethyl methacrylate, and t-butyl aminoethyl methacrylate.

5. The process according to claim 2 where the ratio of water insoluble monomer to functional group-containing monomer in the first stage polymer is about from 10:1 to 1:3.

6. The process according to claim 2 where the ratio of the water insoluble monomer to the functional group containing monomer in the first stage polymer is from about 10:1 to 1:1.

7. The process according to claim 2 where the ratio of the water insoluble monomer to the functional group containing monomer in the first stage polymer is from 7:1 to 3:2.

8. The process according to claim 1 including employing a chain transfer agent to regulate the molecular weight of the first stage polymer.

9. The process of claim 1 wherein the second stage hydrophobic polymer is formed from at least one water insoluble monomer and an effective amount of a pH sensitive functional group containing monomer such that the second stage polymer will not be solubilized upon dissolution of the first stage polymer.

10. The process according to claim 9 wherein the water insoluble monomer is selected from the group consisting of styrene, methyl styrene, α-methyl styrene, ethyl styrene, isopropyl styrene, tertiary butyl styrene, ethyl methacrylate, methyl methacrylate, butyl acrylate, butyl methacrylate, 2-ethyl hexylacrylate, ethyl acrylate, vinyl acetate, methyl acrylate, open chain conjugated dienes, hydroxyethyl methacrylate, hydroxyethyl acetate, methylol acrylamide, glycidyl acrylate and glycidyl methacrylate.

11. The process according to claim 1 including employing a chain transfer agent to regulate the molecular weight of the second stage polymer.

12. The process according to claim 8 wherein the chain transfer agent is bromotrichloromethane.

13. The process according to claim 11 wherein the chain transfer agent is bromotrichloromethane.

14. The process according to claim 1 including crosslinking the second stage polymer.

15. The process according to claim 1 wherein the ratio of first stage polymer to second stage monomer is from about 10:1 to 1:10.

16. The process according to claim 1 wherein the ratio of first stage polymer to second stage monomer is from about 1:1 to 1:7.

17. The process according to claim 1 wherein the process is performed semi-continuously.

18. A film forming product produced according to the process in claim 1.

* * * * *

UNITED STATES PATENT AND TRADEMARK OFFICE
CERTIFICATE OF CORRECTION

PATENT NO. : 4,894,397                                                       Page 1 of 2

DATED : January 16, 1990

INVENTOR(S) : Morgan et al.

It is certified that error appears in the above-identified patent and that said Letters Patent is hereby corrected as shown below: Title page:

In the ABSTRACT, line 1, please change "pruducing" to -- producing --.

At column 2, line 39, please change -- Latexes, "J. -- to -- Latexes," J. --.

At column 2, line 47, please change "dsoft" to -- soft --.

At column 3, line 55, please substitute the word "to" with the word -- the --.

At column 3, line 68, please change "varnishes." to -- varnishes, --.

At column 5, line 24, please change "neopentyl-,3-butadiene" to
-- neopentyl-1,3-butadiene --.

At column 5, line 26, please change "2-cyano-,3-" to -- 2-cyano-1,3- --.

At column 5, line 48, please change "include;" to -- include: --.

At column 6, line 63, please change "chain transfer" to
-- chain transfer agent --.

At column 8, line 51, please change "esters;" to -- esters, --.

At column 13, line 11, please change "Prepartion" to -- Preparation --.

In claim 3, at column 14, lines 29-30, please change "hydroxyethyl acrylate and glycidyl methacrylate" to -- hydroxyethyl acrylate, methylol acrylamide, glycidyl acrylate and glycidyl methacrylate --.

UNITED STATES PATENT AND TRADEMARK OFFICE
CERTIFICATE OF CORRECTION

PATENT NO. : 4,894,397

DATED : January 16, 1990

INVENTOR(S) : Morgan et al.

It is certified that error appears in the above-identified patent and that said Letters Patent is hereby corrected as shown below:

In claim 10, column 14, lines 66-67, please change "hydroxyethyl acetate" to -- hydroxyethyl acrylate --.

Signed and Sealed this

Fifth Day of February, 1991

Attest:

HARRY F. MANBECK, JR.

Attesting Officer

Commissioner of Patents and Trademarks